(12) United States Patent
Matsui et al.

(10) Patent No.: US 7,315,490 B2
(45) Date of Patent: Jan. 1, 2008

(54) OPTICAL PICKUP APPARATUS

(75) Inventors: Tsutomu Matsui, Osaka (JP); Tsuyoshi Kawabata, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 553 days.

(21) Appl. No.: 10/949,470

(22) Filed: Sep. 27, 2004

(65) Prior Publication Data

US 2005/0105407 A1    May 19, 2005

(30) Foreign Application Priority Data

Sep. 29, 2003    (JP) .................. P. 2003-336845

(51) Int. Cl.
*G11B 7/00*    (2006.01)
(52) U.S. Cl. ................ 369/44.15; 269/112.01
(58) Field of Classification Search ............. 369/44.15, 369/44.16, 112.24
See application file for complete search history.

(56) References Cited

U.S. PATENT DOCUMENTS 6,914,730 B2 *   7/2005   Nakano et al. .......... 369/44.32

FOREIGN PATENT DOCUMENTS

| JP | 9-8947 | 3/1997 |
|---|---|---|
| JP | 9-81947 | 3/1997 |
| JP | 2002-334475 | 11/2002 |
| JP | 2003-030890 | 1/2003 |
| JP | 2003-045067 | 2/2003 |
| JP | 2003-115127 | 4/2003 |

\* cited by examiner

*Primary Examiner*—Thang V. Tran
(74) *Attorney, Agent, or Firm*—Morgan, Lewis & Bockius LLP

(57) ABSTRACT

The apparatus has a lens supporting unit which supports one side of a lens holder holding one lens forming a part of an expander lens with a plurality of plate springs, a lens driving unit which apply a driving force to the lens holder utilizing an electromagnetic force, and a solenoid which allows a plunger to be abutted and spaced on and from a surface on one side of the lens holder, with an elastic member interposed therebetween, in a position in the middle of a plurality of connecting regions where the plate springs are respectively connected.

9 Claims, 3 Drawing Sheets

OPTICAL PICKUP APPARATUS

BACKGROUND OF THE INVENTION

1. Field of the Invention

The present invention relates to an optical pickup apparatus for recording and reproducing information on and from an optical disk and a technique which is advantageous when used in, for example, an optical pickup apparatus adapted to optical disks having recording surfaces forming a plurality of layers.

2. Description of the Related Art

For example, in a case wherein information is recorded and reproduced on and from an optical disk having recording surfaces forming two layers, laser light travels different distances before it reaches a recording surface after passing through a transparent layer of the optical disk when a recording surface on the first layer is accessed and when a recording surface on the second layer is accessed.

Further, when laser light enters the transparent layer and converges on the recording surface, the laser light undergoes spherical aberration as it passes through the transparent layer. Spherical aberrations having different magnitudes occur when the recording surface on the first layer is accessed and when the recording surface on the second layer is accessed because the light travels different distances in passing through the transparent layer. In particular, in an apparatus that accommodates writable DVDs (digital versatile disks) and optical disks adapted for violet lasers, a lens having a great numerical aperture must be used as an objective lens for converging laser light on a recording surface. Since the great numerical aperture results in a spherical aberration having a great magnitude, a difference between spherical aberrations on the recording surface of the first layer and the recording surface of the second layer cannot be ignored.

Under the circumstance, a spherical aberration has been corrected in an optical pickup apparatus adapted to optical disks as described above by providing an expander lens comprising two lenses on an optical path from a laser diode to an objective lens and by dynamically changing the interval between the lenses to change the beam diameter.

Conventional configurations for changing the lens interval of the expander lens of such an optical pickup apparatus include a configuration in which a lens holder is supported such that it can be axially slid; a threaded hole is provided in the lens holder and engaged with a screw shaft; and the lens holder is translated by rotating the screw shaft with a motor to change the lens interval.

As disclosed in JP-A-2003-30890, JP-A-2003-45067 and JP-A-2003-115127, configurations have been proposed, in which either or both of lenses constituting an expander lens are movably supported with springs and in which an electromagnetic force is applied to lens holders using a coil and a magnet to change the lens interval.

However, in the above-described driving configuration using a screw shaft, since a clearance between the screw shaft and the threaded hole results in a positional deviation of the lens holder attributable to so-called backlash even if the screw shaft is stopped at a predetermined position of rotation, the lens positions can be changed even by a slight vibration and are therefore difficult to adjust accurately. Further, this configuration has a problem in that it is difficult to achieve compactness because a motor is required and in that it is difficult to change the position of the lens holder quickly because the driving force is generated by the screw shaft.

The diving configurations disclosed in JP-A-2003-30890, JP-A-2003-45067 and JP-A-2003-115127 have a problem in that the lenses can not be maintained at adjusted positions unless a current is continuously passed through the coil that applies the driving force to the lens holder.

SUMMARY OF THE INVENTION

It is an object of the invention to provide an optical pickup apparatus in which the position of an expander lens can be quickly and accurately adjusted and in which the power consumption of a mechanism for such position adjustment can be made small.

In order to achieve the above-described object, according to the invention, an optical pickup apparatus for recording or reproducing data on or from an optical disk by irradiating a recording surface of the same with laser light has a first lens which can be displaced in the direction of an optical axis to correct a spherical aberration of the laser light, a lens supporting unit which supports a lens holder supporting the first lens through an elastic body such that it can be displaced in the direction of the optical axis, a lens driving unit which applies a driving force to the lens holder utilizing an electromagnetic force, an abutting body which can be abutted and spaced on and from the lens holder, and an abutting body driving unit which drives the abutting body.

The above makes it possible to adjust the position of the first lens quickly and accurately with the abutting body spaced from the lens holder and to hold the lens in the adjusted position by putting the abutting body in abutment on the lens holder without any action of the lens driving unit. In general, a spherical aberration is corrected only when the recording surface to be accessed is switched among a plurality of layers, and no correction is required while the recording surface of only one layer is accessed. Therefore, the abutting body may be put in abutment on the lens holder to stop driving with the lens driving unit while the access to the recording surface of the same layer continues, which allows a reduction of power consumption in such a period.

Preferably, the abutting body is provided such that it is put in abutment on the lens holder by a force exerted by a spring when the abutting body driving unit is not energized and such that it is spaced from the lens holder by the driving force of the abutting body driving unit when the abutting body driving unit is energized.

Such a configuration makes it possible to also stop driving with the abutting body driving unit while the access to the recording surface of the same layer continues and to achieve a further reduction of power consumption in such a period.

Specifically, the lens supporting unit may support the lens holder through a plurality of plate springs. The plate springs may be connected to the lens holder in a direction perpendicular to the adjusting direction of the first lens to allow an elastic movement only in the direction in which the first lens is required to be moved, thereby eliminating positional deviations in other directions.

Specifically, a plunger and a solenoid may be used as the abutting body and the abutting body adjusting unit, respectively, the solenoid abutting and spacing the plunger on and from the lens holder. Alternatively, a configuration may be employed in which the abutting body is held with a plurality of plate springs and in which the abutting body is abutted and spaced on and from the lens holder using an electromagnetic force provided by a coil and a permanent magnet. Such configurations make it possible to provide a compact and low-cost configuration. A configuration in which the abutting body is moved by a small motor may alternatively be employed.

Preferably, an elastic member is provided at the region when the abutting body abuts on the lens holder. More preferably, the abutting body is provided such that it abuts on a surface of one side of the lens holder in a position in the middle of a plurality of connecting positions in each of which the elastic member is connected to the holder.

From the above, any shock that occurs when the abutting body is abutted and spaced on and from the holder can be buffered by the elastic member, and the above described abutting position allows the holder to be stably secured by a smaller force without any deviation attributable to a slight vibration. It is therefore possible to minimize positional deviations of the lens holder that occur when the abutting body abuts on the lens holder.

The invention is advantageous in that the position of the first lens for adjusting a spherical aberration can be quickly and accurately adjusted and in that power saving can be achieved for the position adjusting mechanism.

Since no motor is used, there is an advantage in that the position adjusting mechanism can be compactly configured at a low cost.

There is another advantage in that any positional deviation of the lens holder is prevented when the lens holder is secured after the position of the first lens is adjusted, and the holder can be stably secured without any misadjustment attributable to a slight vibration.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

An embodiment of the invention will now be described with reference to the drawings.

Figure 1:
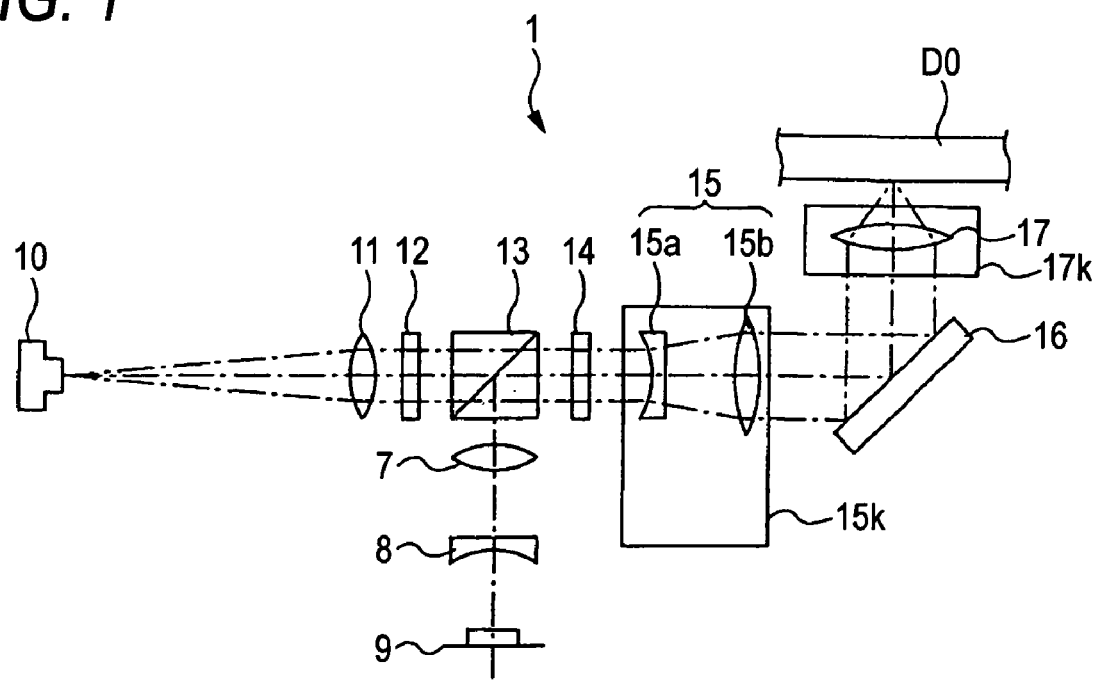
FIG. 1 shows a general configuration of an optical system of an optical pickup apparatus according to an embodiment of the invention.

FIG. 1 shows a general configuration diagram of an optical system of an optical pickup apparatus according to an embodiment of the invention.

An optical pickup apparatus 1 of the present embodiment records and reproduces on and from a recording surface of, for example, an optical disk D0 having recording surfaces on two layers adapted to violet lasers by irradiating the recording surface with violet laser light.

The optical system of the optical pickup apparatus 1 is comprised of a semiconductor laser 10 emitting laser light having a wavelength of, for example, 405 nm, a collimator lens 11 for collimating the emitted light, a diffracting grating 12 for transforming the laser light into three beams to perform focus correction and tracking correction, a polarization beam splitter 13 for separating the emitted light and reflected light, a ¼-wave plate 14 cooperating with the polarization beam splitter 13 to serve as an optical isolator, an expander lens 15 for changing the beam diameter to correct any spherical aberration of the laser light, a raising mirror 16, an objective lens 17 for converging the laser light on a recording surface of the optical disk D0, a collimator lens 7 for converging reflected light which has been reflected by the optical disk D0 and separated by the beam splitter 13, a cylindrical lens 8 for applying an astigmatic aberration to the laser light to correct the focus thereof, and an optical sensor 9 for detecting the reflected light.

The elements of the optical system are assembled in a machine casing, which is not shown, of the optical pickup apparatus 1 to form a unit. The objective lens 17 and a convex lens 15b forming a part of the expander lens 15 are secured to the machine casing through actuators 17K and 15K, respectively, such that their positions can be dynamically changed.

The above-described objective lens 17 has a great numerical aperture NA, for example, in the range from 0.85 to 1.00, and a spherical aberration occurs in an amount which cannot be ignored in recording and reproducing data when the laser light passes through a transparent layer covering the recording surface of the optical disk.

The expander lens 15 is constituted by a combination of two lenses (e.g., a concave lens 15a and a convex lens 15b), and the interval between the lenses can be changed to change the beam diameters of light entering the same and light exiting the same, thereby allowing any spherical aberration of laser light to be corrected.

In the present embodiment, the convex lens 15b which is one of the two lenses 15a and 15b of the expander lens 15 can be displaced by the actuator 15K in the direction of an optical axis. The concave lens 15a may alternatively be displaced and, further alternatively, both of the lenses 15a and 15b may be displaced.

Figure 2:
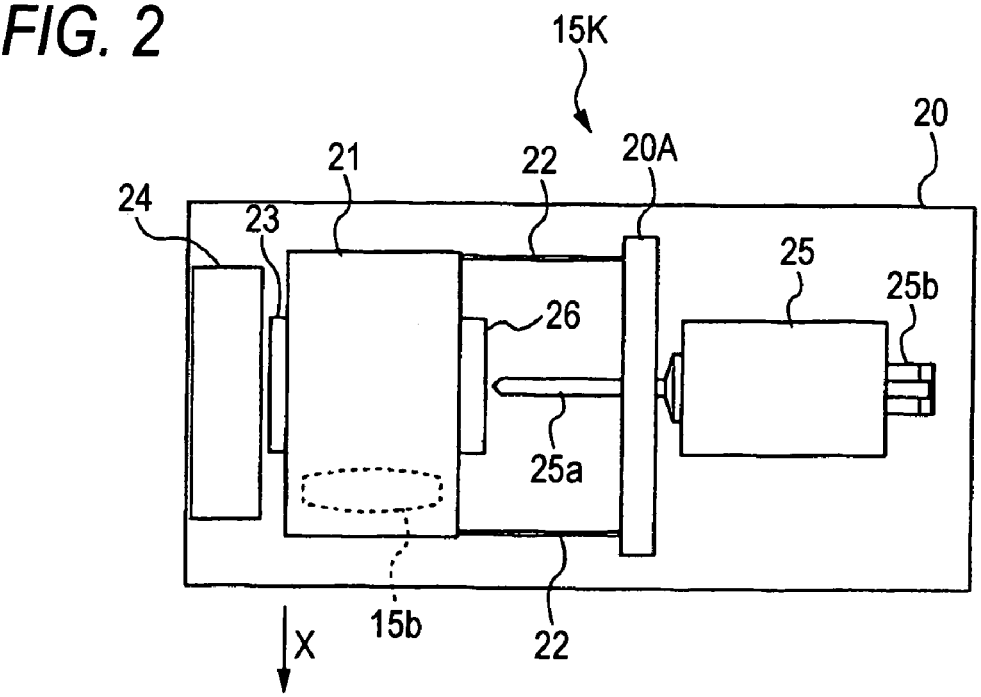
FIG. 2 is a plan view showing an actuator for the expander lens in FIG. 1.
Figure 3:
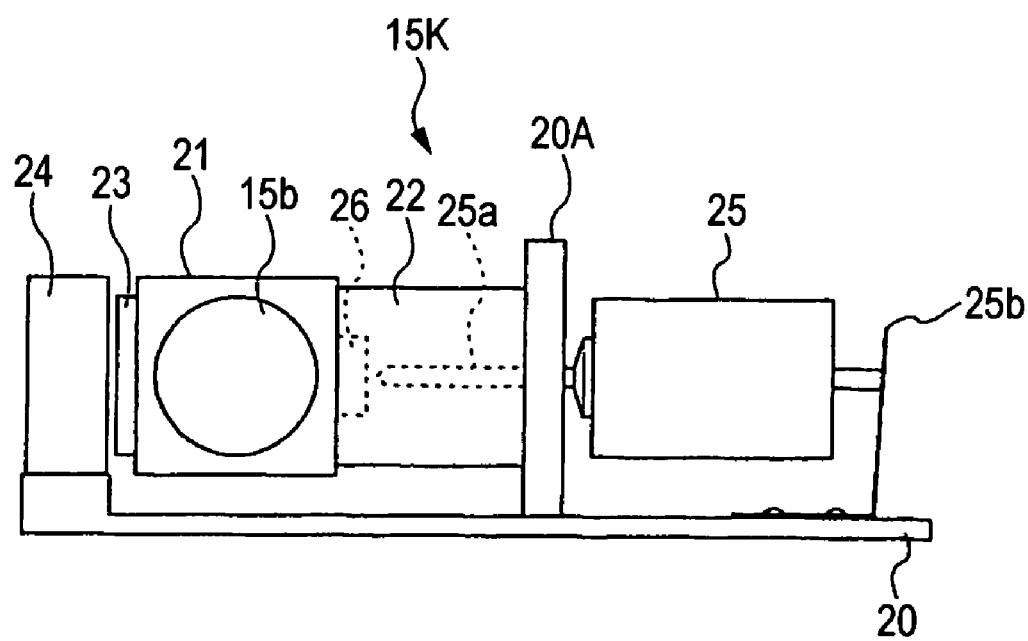
FIG. 3 is a front view of the actuator.

FIG. 2 shows a plan view of the actuator 15K for the convex lens 15b of the expander lens 15, and FIG. 3 shows a front view of the same.

As shown in FIGS. 2 and 3, the actuator 15K for the expander lens 15 is comprised of a lens holder 21 for holding the lenses, two plate springs 22 as elastic bodies for supporting the lens holder 21, a coil 23 secured to one side of the lens holder 21 (a side which is opposite to a side where connecting points between the plate springs 22 and a projecting frame 20A are located), a permanent magnet 24 provided in a face-to-face relationship with the coil 23, a solenoid 25 secured to the machine casing which is not shown for driving a plunger 25a back and forth, and an elastic member 26 for buffering secured to the other side of the lens holder (the side where the connecting points between the plate springs 22 and the projecting frame 20A are located).

The two parallel plate springs 22 connected to the lens holder 21 at one end thereof are connected to the projecting frame 20A (a lens supporting unit) of the machine casing 20 at the other end thereof, and the holder 21 is thereby supported such that it can be translated in a direction normal to the plate springs 22.

Figure 4:
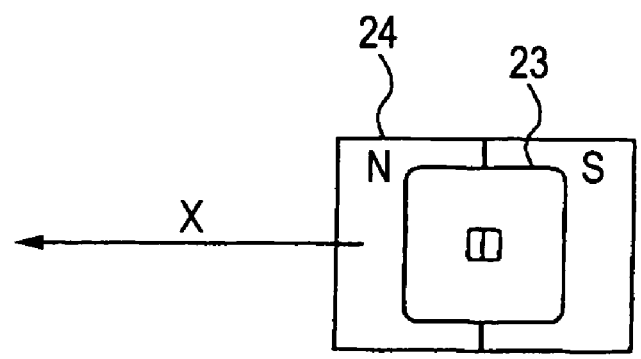
FIG. 4 illustrates the positional relationship between a coil provided on a side of the lens holder shown in FIG. 2 and a permanent magnet.

FIG. 4 illustrates the positional relationship between the coil 23 provided on a side of the lens holder and the permanent magnet 24.

As shown in FIG. 4, the coil 23 provided on a side of the lens holder 21 is a thin square coil provided by winding a wire along four sides of a thin square frame. The permanent magnet 24 is magnetized such that the side thereof facing the coil 23 is split, in the middle thereof, into a north pole and a south pole which are bounded by a line of polarization extending in the vertical direction. The square coil 23 and the permanent magnet 24 are provided in positions in which center lines of the square coil 23 and the permanent magnet 24 overlap each other in a face-to-face relationship when the lens holder 21 is in a free state and the coil 23 is not energized. In such a configuration, when the square coil 23 is energized in a predetermined direction, the lens holder is oppositely energized in an X direction and is thereby driven in the opposite direction.

The solenoid 25 (in FIGS. 2 and 3) is driven such that the plunger 25a is forwardly urged by the spring 25b when it is not energized and such that the plunger 25a is pulled back when it is energized. The solenoid is secured to the machine casing which is not shown such that the tip of the plunger 25a slightly presses the elastic member 26 of the lens holder 21 when it is not energized. The projecting frame 20A supporting the lens holder 21 has a through hole in a region thereof where the plunger 25a passes through such that it will not interfere with the plunger 25a.

The plunger 25a abuts on the lens holder 21 in a position in the vicinity of the center of the side thereof from which the plate springs 22 extend. The position in which the plunger 25a abuts on the lens holder 21 is in the vicinity of the center of the side of the holder from which the plate springs 22 extend. The position is also in the middle of the two locations where the lens holder 21 and the plate springs 22 are connected. Such an abutting position allows the plunger 25a to be secured with stability when it is abutted on the holder. For example, rubber or various types of resin may be used as the elastic member secured to a side of the lens holder 21.

The actuator 15 of the above-described expander lens 15 is disposed such that the convex lens 15b is located in the middle of a position associated with a recording surface on a first layer of the optical disk and a position associated with a recording surface on a second layer of the optical disk when the plunger 25a is spaced from the lens holder 21 and the square coil 23 is not energized (which is hereinafter referred to as "reference state").

The square coil 23 is energized in such a state, and the lens holder 21 is moved, for example, +4.5 μm in the X direction from its position in the reference state. Thereafter, the energization of the solenoid 25 is stopped, and the lens holder 21 is secured with the plunger 25a. The expander lenses 15a and 15b can be thus set at an interval that is associated with the recording surface on the first layer.

At the time of switching from access to the first surface on the first layer to access to the recording surface on the second layer, similarly, the square coil 23 is energized with the solenoid 25 energized to cancel the securement of the lens holder 21, and the lens holder 21 is moved, for example, 4 μm in a -X direction from its position in the reference state. Thereafter, the energization of the solenoid 25 is stopped to secure the lens holder 21 with the plunger 25a. The expander lenses 15a and 15b can be this set at an interval that is associated with the recording surface on the second layer. The energization of the square coil 23 is stopped after the lens holder 21 is secured with the plunger 25a.

As described above, in the optical pickup apparatus 1 of the present embodiment, the position of the convex lens 15b of the expander lend 15 can be quickly and accurately adjusted, and the actuator 15K for the convex lens 15b can be put in a non-energized state when the recording surface on the same layer is accessed after the position adjustment, which allows a reduction in the total power consumption of the optical pickup apparatus 1.

Since the mechanism for adjusting the position of the expander lens 15 of the optical pickup apparatus 1 (the actuator 15K) requires no large-sized component such as a motor, a compact and inexpensive configuration can be provided.

The above-described structure for supporting the lens holder 21 and the above-described position of the abutment of the plunger 25a on the lens holder 21 allow the holder to be stably secured with a small force. Since only a small force is required, positional deviations of the lens holder 21 can be minimized when it is secured.

Other embodiments of a structure for supporting a lens holder 21 and a mechanism for securing the lens holder 21 and canceling the securement of the same will now be described.

Figure 5:
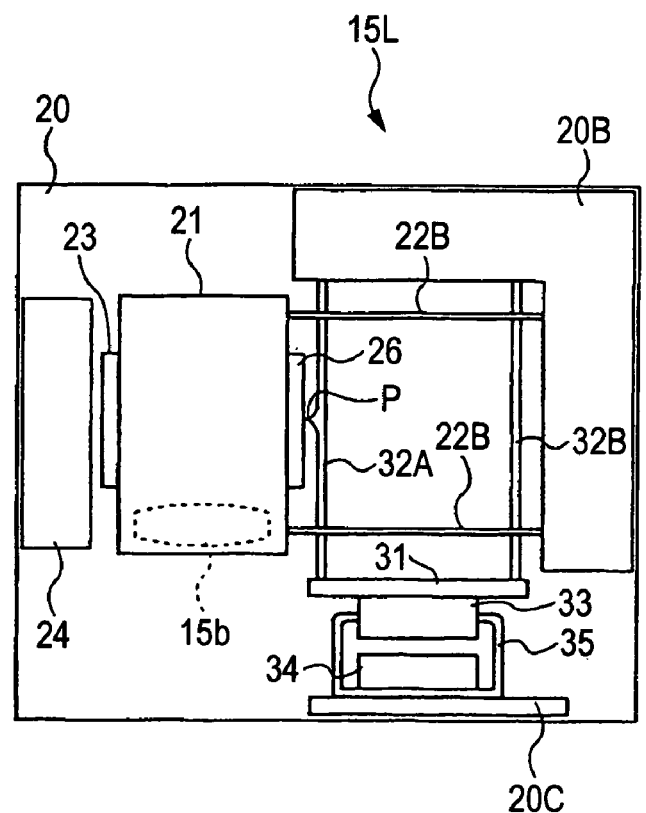
FIG. 5 is a plan view showing another embodiment of an actuator for an expander lens.
Figure 6:
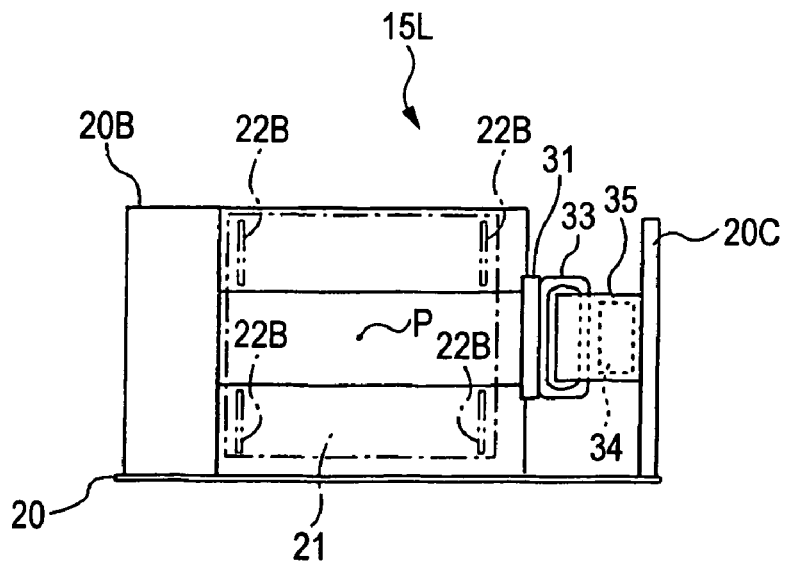
FIG. 6 is a left side view showing a plate spring 32A having a protrusion P and a driving unit for the same which form a part of the actuator shown in FIG. 5.

FIG. 5 shows a plan view of an actuator for an expander lens 15 (convex lens 15b), and FIG. 6 shows left side views of plate springs 32A and 32B and a driving unit for the same.

An actuator 15L of the expander lens 15 according to the present embodiment is comprised of a lens holder 21 for supporting lenses, four plate springs 22B for supporting the lens holder 21, a coil 23 secured to a side of the lens holder 21 opposite to the supported side of the lens holder 21, a permanent magnet 24 provided in a face-to-face relationship with the coil 23, two plate springs 32A and 32B connected in parallel with each other between a projecting frame 20C and a movable frame 31, and a permanent magnet 34 and a yoke 35 secured to the coil 33 and the projecting frame 20C for driving the plate springs 32A and 32B and the movable frame 31 to the left and right.

In the present embodiment, the lend holder 21 is connected to one end of each of the plate springs 22B which are secured to the projecting frame 20C of the machine casing 20 at the other ends thereof and is thereby supported such that it can be translated in a direction normal to the plate springs 22B. As shown in FIG. 6, the four plate springs 22B are connected to a surface on one side of the lens holder 21 in four locations thereof, i.e., upper and lower locations on the left and right sides of the surface, the springs being in parallel with each other. The two or upper and lower plate springs 22B on the left are disposed on the same plane in an overlapping relationship with each other. The two or upper and lower plate springs 22B on the right are also disposed on the same plane in an overlapping relationship with each other.

The square coil 23 and the permanent magnet 24 for driving the lens holder 21 and an elastic member 26 are similar to those shown in FIG. 2.

In the actuator 15L of the expander lens 15 in the present embodiment, a protrusion P formed on the plate spring 32A is used as an abutting body for fixing the position of the lens holder 21. The plate spring 32A and the plate spring 32B connected in parallel with the same are disposed at a height between the upper plate springs 22B and the lower plate springs 22B such that they will not interfere with the four plate springs 22B supporting the lens holder 21. The protrusion P is formed such that it is located in a position in the middle of the four locations where the plate springs 22B and the lens holder 21 are connected. The plate springs 32A and 32B are disposed such that the protrusion P of the plate spring 32A abuts on the elastic member 26 of the lens holder 21 with a small force when the coil 33 is not energized and no driving force is applied to the movable frame 31. Besides, an auxiliary protrusion may be used as an auxiliary abutting body for fixing the position of the lens holder 21, in addition to the protrusion P.

The coil 33 for driving the plate spring 32A is provided by winding a lead wire in a cylindrical configuration and is attached to the above-described movable frame 31 to which the plate spring 32A is connected. A yoke 35 is disposed in the coil 33, so that magnetic flux generated between the permanent magnet 34 and the yoke 35 penetrates through a side section of the coil 33. In such a configuration, the movable frame 31 and the plate springs 32A and 32B can be driven in the direction of moving away from the lens holder 21 by a current that flows through the coil 33 in a predetermined direction.

In the above-described configuration, the position of the lens holder 21 can be adjusted with the coil 33 energized to space the protrusion P of the plate spring 32A from the lens holder 21 in the same way in which the actuator 15K in FIG. 2 works. By stopping the energization of the coil 33 after the position adjustment, the protrusion P of the plate spring 32A abuts on the elastic member 26 of the lens holder 21 to fix the position of the lens holder 21.

As described above, in the optical pickup apparatus of the present embodiment, the expander lens 15 can be quickly and accurately adjusted similarly to that in the embodiment shown in FIG. 2, and power saving can be achieved during a normal operation after the position adjustment. Since no large-sized component such as a motor is used, a compact and inexpensive configuration can be provided.

The above-described structure for supporting the lens holder 21 using the plate springs 22B and the above-described abutting position of the protrusion P of the plate spring 32A allow the holder to be stably secured with a small force. Since only a small force is required, positional deviations of the lens holder 21 can be minimized when it is secured.

The invention is not limited to the above-described embodiments and may be modified in various ways. For example, while optical pickup apparatus adapted to optical disks D0 having recording surfaces on two layers have been referred to by way of example in the embodiments, similar configurations may be used for an optical pickup apparatus adapted to recording surfaces on four layers. Further, the invention is not limited to optical disks adapted to violet lasers.

The invention is not limited to the configurations for driving the lens holder 21 utilizing an electromagnetic force shown in FIGS. 2 and 5. For example, alternative configurations are possible for the cylindrical coil 33, the permanent magnet 34, and the yoke 35 fro driving the movable frame 31 in FIG. 5. As the unit for driving the abutting body for fixing the position of the lens holder (actuator), a motor such as a voice coil motor may be used instead of using a solenoid as shown in FIGS. 2 and 5.

What is claimed is:

1. An optical pickup apparatus for recording or reproducing data by irradiating a recording surface of an optical disk with laser light, comprising:
a first lens which can correct a spherical aberration of laser light by being displaced in the direction of the optical axis;
a lens supporting unit which supports one side of a lens holder supporting the first lens with a plurality of plate springs such that the lens holder can be displaced in the direction of the optical axis;
a lens driving unit which applies a driving force to the lens holder utilizing an electromagnetic force; and
an actuator which allows a plunger or a plate spring to be abutted and spaced on and from a surface of the one side of the lens holder, with an elastic member interposed therebetween, in a position in the middle of a plurality of connecting regions where the plate springs are respectively connected,
wherein the plunger or the plate spring is put into abutment on the lens holder by a force exerted by a spring when the actuator is not energized and wherein the plunger is spaced from the lens holder when the actuator or the plate spring is energized.

2. An optical pickup apparatus for recording or reproducing data by irradiating a recording surface of an optical disk with laser light, comprising:
a first lens which can correct a spherical aberration of laser light by being displaced in the direction of the optical axis;
a lens supporting unit which supports a lens holder supporting the first lens through an elastic member such that the lens holder can be displaced in the direction of the optical axis;
a lens driving unit which applies a driving force to the lens holder utilizing an electromagnetic force;
an abutting body which can be abutted and spaced on and from the lens holder; and
an abutting body driving unit which drives the abutting body.

3. The optical pickup apparatus according to claim 2, wherein the abutting body is configured such that it is put into abutment on the lens holder by a force exerted by a spring when the abutting body driving unit is not energized and such that it is spaced from the lens holder by a driving force of the abutting body driving unit when the abutting body driving unit is energized.

4. The optical pickup apparatus according to claim 2, wherein the lens supporting unit is configured such that it supports the lens holder through a plurality of plate spring.

5. The optical pickup apparatus according to claim 2, wherein the abutting body and the abutting body driving unit comprise a plunger and a solenoid for abutting and spacing the plunger on and from the lens holder, respectively.

6. The optical pickup apparatus according to claims 2, wherein an elastic member is provided in the region where the abutting body abuts on the lens holder.

7. The optical pickup apparatus according to claim 2, wherein the lens supporting unit is configured such that it supports one side of the lens holder through a plurality of elastic members and wherein the abutting body is disposed such that it abuts on a surface of the one side of the lens holder in a position in the middle of a plurality of connecting regions where the elastic members are respectively connected.

8. The optical pickup apparatus according to claim 2, wherein the abutting body and the abutting body driving unit include a plate spring and a solenoid for abutting and spacing the plate spring on and from the lens holder, respectively.

9. The optical pickup apparatus according to claim 2, further comprising
an auxiliary abutting body which can be abutted and spaced on and from the lens holder, in addition to the abutting body.

* * * * *